United States Patent [19]
Cordell, Jr.

[11] 3,824,733
[45] July 23, 1974

[54] OPEN TOP COMPARTMENTED LID

[76] Inventor: Carl R. Cordell, Jr., P.O. Box 2020, Hot Springs, Ark. 71901

[22] Filed: Dec. 22, 1972

[21] Appl. No.: 317,777

[52] U.S. Cl. .......................................... 43/54.5 R
[51] Int. Cl. .......................................... A01k 97/06
[58] Field of Search ......................... 43/54.5, 57.5

[56] References Cited
UNITED STATES PATENTS

| | | | |
|---|---|---|---|
| 1,561,351 | 11/1925 | Nielsen | 43/54.5 R |
| 2,596,403 | 5/1952 | Hoffman | 43/54.5 R |
| 2,889,658 | 6/1959 | Shanks | 43/57.5 R |
| 3,095,663 | 7/1963 | Miller | 43/54.5 R |

*Primary Examiner*—Warner H. Camp
*Attorney, Agent, or Firm*—Berman, Bishoff & Platt

[57] ABSTRACT

An open top compartmented lid is integrally formed of plastic and has a plurality of generally rectangular compartments of varying sizes formed centrally in the upper surface thereof to receive a plurality of fishing tackle items supported therein temporarily while other items are being used for fishing. A support for a fishing rod is formed in the plastic lid and includes a well to receive the reel on the rod without requiring the removal therefrom. A plurality of stiffening members extend waffle-like across two end portions of the lid for strengthening the lid and providing small compartments for temporarily storing relatively small items of fishing gear or tackle. The lid includes substantially upright side walls supporting a generally horizontal top wall integrally formed thereon.

4 Claims, 7 Drawing Figures

PATENTED JUL 23 1974  3,824,733
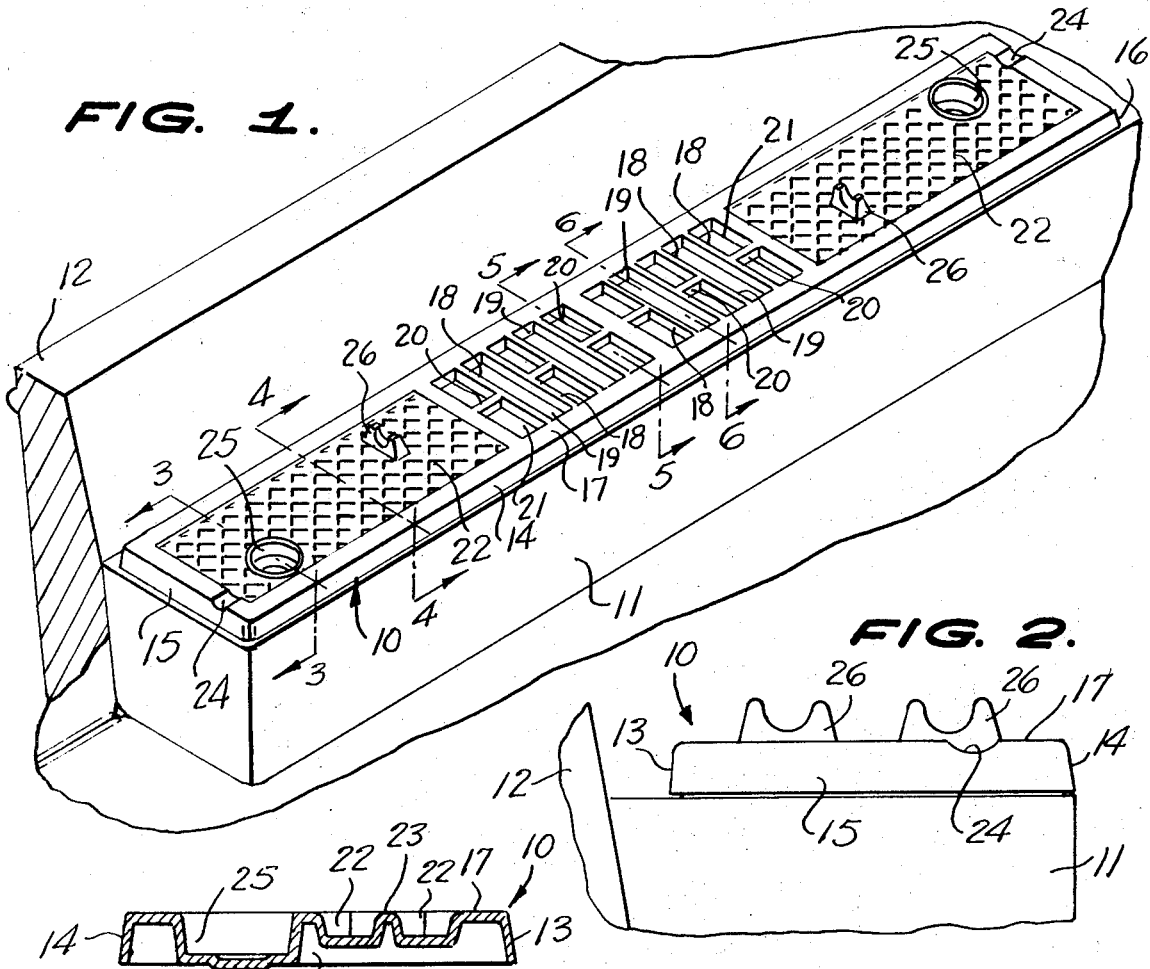
FIG. 1.
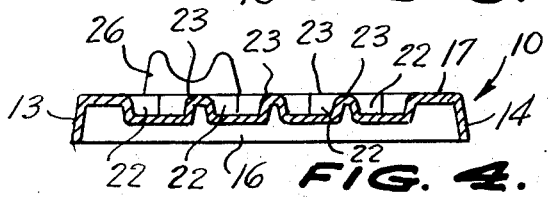
FIG. 2.
FIG. 3.
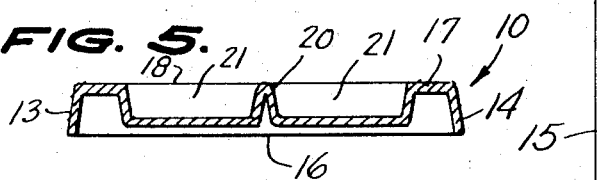
FIG. 4.
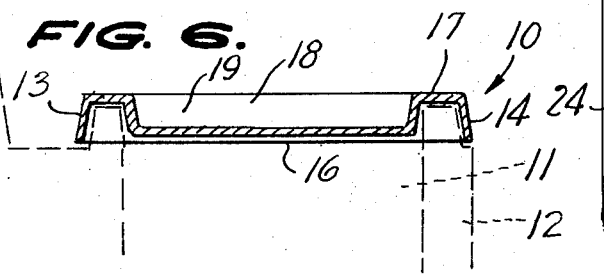
FIG. 5.
FIG. 6.
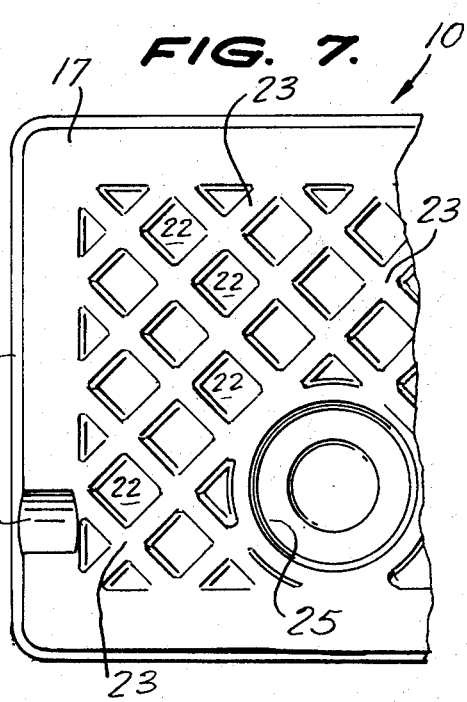
FIG. 7.

OPEN TOP COMPARTMENTED LID

BACKGROUND OF THE INVENTION

1. Field of the Invention

The present invention relates to compartmented open top lids serving as a temporary support for items of fishing tackle and a closure for a storage or bait compartment.

2. Description of the Prior Art

Fishing tackle in the prior art is normally stored in a fishing tackle box having a plurality of compartmented shelves formed therein. Since a tackle box occupies valuable space in a boat and, when open is ungainly, the fisherman after extracting the lures and other tackle desired, normally closes the box and moves it out of his way. As he then changes tackle, he simply deposits the used tackle on the deck of the boat, on the various seats, motor cover, or any other handy spot he can find. After a period of fishing has elapsed, the lures and other tackle scattered about the boat are so numerous as to seriously interfere with the use of the boat for normal fishing and travel to and from the fishing grounds.

SUMMARY OF THE INVENTION

The present invention relates to a fisherman's open top compartmented lid for temporarily supporting fishing tackle not then in use. The lid includes substantially vertical side walls integrally supporting a top wall having compartments formed therein and a fishing rod support formed thereon. The compartmented lid serves to collect and support all types of fishing lures and other fishing tackle which would otherwise have to be stored in the fishing tackle box which accompanies all fisherman.

The primary object of the invention is to provide a one-piece compartmented lid for storage compartments, bait wells, and containers on a boat to permit the fisherman to better classify and support the fishing tackle in a convenient position on a fishing expedition.

Other objects and advantages will become apparent from the following specification and claims when considered in light of the attached drawings.

BRIEF DESCRIPTION OF THE DRAWINGS

FIG. 1 is a perspective view of the invention shown installed on the storage compartment of a boat.

FIG. 2 is an enlarged end elevational view of the invention when installed as in FIG. 1.

FIG. 3 is an enlarged transverse cross-sectional view taken along line 3—3 of FIG. 1 looking in the direction of the arrows.

FIG. 4 is an enlarged fragmentary transverse cross-section taken along line 4—4 of FIG. 1, looking in the direction of the arrows.

FIG. 5 is an enlarged fragmentary transverse cross-section taken along line 5—5 of FIG. 1 looking in the direction of the arrows.

FIG. 6 is an enlarged fragmentary transverse cross-section taken along line 6—6 of FIG. 1 looking in the direction of the arrows.

FIG. 7 is an enlarged fragmentary top plan view of the invention.

DESCRIPTION OF THE PREFERRED EMBODIMENT

Referring now to the drawings in detail, wherein like reference characters designate like parts throughout the several figures, the reference numeral 10 indicates generally a lid formed of one-piece plastic material for a storage compartment 11 on a boat 12.

The lid 10 includes a pair of spaced inwardly converging side walls 13, 14 joined by spaced upwardly converging end walls 15, 16. A top wall 17 is integrally formed with the upwardly converging side walls 13, 14 and the upwardly converging end walls 15, 16.

The top wall 17 has a plurality of transversely extending ribs 18 formed therein in the same horizontal plane as the top wall 17 and delineating recessed compartments 19. A plurality of spaced longitudinal ribs 20 extend between the ribs 18 intermediate the opposite ends thereof to delineate relatively short compartments 21. The compartments 19 and the compartments 21 are adapted to hold fishing lures and other fishing tackle which may be temporarily supported therein during fishing. At each end of the lid 10, the top wall 17 is provided with a plurality of relatively small compartments 22 delineated by a plurality of ribs 23. The ribs 23 lie in the same general horizontal plane as the top wall 17 and extend at approximately a forty-five degree angle across the top wall with respect to the side walls 13, 14 forming a waffle-like area, to stiffen and strengthen the lid 10.

An arcuate depression 24 is formed in each end of the top wall 17 adjacent the end walls 15, 16 respectively for reasons to be assigned. A generally cylindrical open top compartment 25 extends downwardly into the top wall 17 adjacent each end thereof. An upstanding generally U-shaped fishing rod support 26 projects upwardly from the top wall 17 in each end portion of the lid 10.

In the use and operation of the invention, the lid 10 is preferably used to cover a storage compartment 11 on a boat 12 and the fisherman places the lures and other tackle in the compartments 19, 21 which he uses during a particular fishing expedition.

A fishing rod may be supported on the lid 10 by engaging the butt handle thereof in the arcuate recess 24 with the reel fitting in the compartment 25 and the major portion of the length of the rod supported on the U-shaped support 26. The relatively small compartments 22, delineated by the strengthening ribs 23, may be used to temporarily store small pieces of fishing tackle, such as hooks, swivels, snaps and the like.

The lid 10 with its large number of compartments 19, 21, 22 permits the fisherman to lay out his tackle in a segregated classified manner with the tackle remaining in each separate compartment until the fisherman is ready to make use of the same.

The lid is preferably molded in one piece from relatively rigid, non-porous plastic which can be easily cleaned and resists damage from the hooks of the tackle which would damage softer materials. Of course, other material of a rust-proof nature could be used.

Having thus described the preferred embodiment of the invention, it should be understood that numerous structural modifications and adaptations may be resorted to without departing from the spirit of the invention.

What is claimed is:

1. The combination of a lidless open top storage container for boats and a single lid closing said open top, said lid being of one piece non-rasting integral construction and comprising a top wall with depending side and end walls conformably shaped to seat upon the upper edges of said open top container, a plurality of open top recessed compartments formed integrally in said top wall and located medially of said top wall, and waffle-like stiffening means formed in at least one end portion of said top wall between an end wall and the recessed compartments, said lid being removably supported upon said upper edges without any further cover for said container whereby said open top compartments are available for immediate use.

2. A device as claimed in claim 1 wherein said waffle-like stiffening means includes a plurality of small recessed compartments delineated by a plurality of spaced apart ribs integrally formed in said top wall.

3. A device as claimed in claim 2 including a deep compartment formed in said top wall and a generally U-shaped upstanding rod support formed in said top wall cooperating to support a fishing rod and reel with the reel engaging in said deep compartment.

4. A device as claimed in claim 1 including a deep compartment formed in said top wall and a generally U-shaped upstanding rod support formed in said top wall cooperating to support a fishing rod and reel with the reel engaging in said deep compartment.

* * * * *